United States Patent
Subirada et al.

(10) Patent No.: US 7,027,185 B2
(45) Date of Patent: Apr. 11, 2006

(54) LINEARIZATION OF AN INCREMENTAL PRINTER BY MEASUREMENTS REFERRED TO A MEDIA-INDEPENDENT SENSOR CALIBRATION

(75) Inventors: Francesco Subirada, Barcelona (ES); Pau Soler, Barcelona (ES); Johan Lammens, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 09/919,207

(22) Filed: Jul. 30, 2001

(65) Prior Publication Data

US 2003/0086102 A1    May 8, 2003

(51) Int. Cl.
*G06F 15/00*    (2006.01)
*H04N 1/46*    (2006.01)
*B41J 29/393*    (2006.01)

(52) U.S. Cl. ............................ 358/1.9; 358/504; 347/19
(58) Field of Classification Search .................. 358/1.9, 358/2.1, 504, 301, 502, 503, 501, 3.27, 494, 358/530; 347/2, 3, 19, 115, 221
See application file for complete search history.

(56) References Cited

U.S. PATENT DOCUMENTS

| | | | | |
|---|---|---|---|---|
| 5,272,518 A | * | 12/1993 | Vincent | 356/405 |
| 5,291,221 A | * | 3/1994 | Sanger et al. | 347/234 |
| 5,323,179 A | * | 6/1994 | Sanger et al. | 347/237 |
| 5,327,252 A | * | 7/1994 | Tsuruoka et al. | 358/406 |
| 5,363,318 A | * | 11/1994 | McCauley | 702/85 |
| 5,543,940 A | * | 8/1996 | Sherman | 358/518 |
| 5,671,059 A | * | 9/1997 | Vincent | 356/402 |
| 5,710,824 A | * | 1/1998 | Mongeon | 382/162 |
| 5,778,160 A | * | 7/1998 | Smith | 358/1.9 |
| 5,818,960 A | * | 10/1998 | Gregory et al. | 382/167 |
| 6,161,914 A | * | 12/2000 | Haselby | 347/19 |
| 6,178,007 B1 | * | 1/2001 | Harrington | 358/1.9 |
| 6,222,648 B1 | * | 4/2001 | Wolf et al. | 358/504 |
| 6,270,187 B1 | * | 8/2001 | Murcia et al. | 347/43 |
| 6,271,934 B1 | * | 8/2001 | Hayashi | 358/1.9 |
| 6,290,319 B1 | * | 9/2001 | Boleda et al. | 347/19 |
| 6,312,098 B1 | * | 11/2001 | Miquel et al. | 347/41 |
| 6,336,702 B1 | * | 1/2002 | Zapata et al. | 347/41 |
| 6,443,556 B1 | * | 9/2002 | Garcia et al. | 347/43 |
| 6,494,558 B1 | * | 12/2002 | Doval et al. | 347/19 |
| 6,523,936 B1 | * | 2/2003 | Zapata et al. | 347/41 |
| 6,535,307 B1 | * | 3/2003 | Allen et al. | 358/504 |

(Continued)

FOREIGN PATENT DOCUMENTS

WO    WO 95/08183    *    3/1995

*Primary Examiner*—Madeleine Nguyen
(74) *Attorney, Agent, or Firm*—Peter I. Lippman (57) ABSTRACT

A printing system is linearized automatically using measurements made with a simple optical sensor, such as a line sensor, that is onboard the system. The printing system itself is for forming images on plural printing media. Because the optical sensor is not a calorimeter or even a true densitometer, the sensor requires calibration, preferably based upon measurements using real inks. In the past it has been considered a requirement that such calibration be performed separately using each of the print media that was to be used for printing images. Linearization according to the invention, however, refers to a single calibration of the sensor, that calibration being used in common for essentially all media—even though the single calibration is performed with respect to exclusively a single one of the plural media.

27 Claims, 3 Drawing Sheets

U.S. PATENT DOCUMENTS

| | | | |
|---|---|---|---|
| 6,547,362 B1 * | 4/2003 | Subirada et al. | 347/19 |
| 6,567,170 B1 * | 5/2003 | Tandon et al. | 356/406 |
| 6,585,340 B1 * | 7/2003 | Borrell | 347/14 |
| 6,639,669 B1 * | 10/2003 | Hubble et al. | 356/319 |
| 6,690,485 B1 * | 2/2004 | Borrell et al. | 358/1.9 |
| 6,799,823 B1 * | 10/2004 | Miquel et al. | 347/15 |
| 6,830,399 B1 * | 12/2004 | Adkins et al. | 400/582 |
| 6,832,824 B1 * | 12/2004 | Baker et al. | 347/19 |
| 2002/0021321 A1 * | 2/2002 | Nakajima et al. | 347/19 |
| 2002/0037191 A1 * | 3/2002 | Lesniak et al. | 400/582 |
| 2002/0126171 A1 * | 9/2002 | Subirada et al. | 347/19 |

* cited by examiner

LINEARIZATION OF AN INCREMENTAL PRINTER BY MEASUREMENTS REFERRED TO A MEDIA-INDEPENDENT SENSOR CALIBRATION

RELATED PATENT DOCUMENTS

Related documents are other, coowned U.S. utility-patent documents hereby incorporated by reference in their entirety into this document. One is in the names of Pau Soler et al., entitled "COMPENSATING FOR DRIFT AND SENSOR PROXIMITY IN A SCANNING SENSOR, IN COLOR CALIBRATING INCREMENTAL PRINTERS" and later assigned U.S. patent application Ser. No. 09/919,260, issued as U.S. 2003/0020972; another of Francesc Subirada et al., entitled "TEST-BASED ADVANCE OPTIMIZATION IN INCREMENTAL PRINTING: MEDIAN, SENSITIVITY-WEIGHTED MEAN, NORMAL RANDOM VARIATION" and later assigned U.S. patent application Ser. No. 09/766,514 issued as U.S. Pat. No. 6,547,362; still another of Francesc Subirada et al., U.S. application Ser. No. 09/034,722, "SCANNING AN INKJET TEST PATTERN FOR DIFFERENT CALIBRATION ADJUSTMENTS", issued as U.S. Pat. No. 6,196,652; another of Thomas H. Baker et al., Ser. No. 09/183,819 entitled "COLOR-CALIBRATION SENSOR SYSTEM FOR INCREMENTAL PRINTING" and issued as U.S. Pat. No. 6,832,824; yet another of Francis Bockman and Guo Li, entitled "CONSTRUCTING DEVICE-STATE TABLES FOR INKJET PRINTING", U.S. application Ser. No. 08/960,766, issued as U.S. Pat. No. 6,178,008; and U.S. Pat. No. 5,796,414 of Otto Sievert et al., "SYSTEMS AND METHOD FOR ESTABLISHING POSITIONAL ACCURACY IN TWO DIMENSIONS BASED ON A SENSOR SCAN IN ONE DIMENSION".

FIELD OF THE INVENTION

This invention relates generally to machines and procedures for incremental printing of text or graphics on printing media such as paper, transparency stock, or other glossy media; and more particularly to calibration of a sensor used in such machines and procedures for linearization preparatory to printing with two or more of such media.

BACKGROUND OF THE INVENTION

For short-run work, particularly for single copies or a few copies, incremental printers are far faster and more economical than printing presses. This enormous advantage flows from a totally different set of approaches, techniques and processes in the two technologies.

Incremental printers form colors through a set of essentially electromechanical procedures, though chemistry is important in the interaction between inks and printing media. These procedures are quite different from the fundamentally optical/photochemical (and modernly also computer-graphics) operations used in offset printing.

Incremental printing does have its own limitations and constraints. Such limitations can be appreciated from a comparison of the methods used for defining pixels, and forming colors, in the two very different technologies.

(a) Printing-press technology—Traditionally, pixels of offset negatives and plates are defined and shaded by extremely high-precision—and extremely expensive—camera lenses, factory preformed soft-dot screens, and exposure-time controls.

More modernly, as seen for instance in the patents of Dainippon Screen, offset pixels are in part defined and shaded by similarly high-precision, expensive electronic systems. In both of these conventional offset approaches, i.e. traditional and modern, the overriding technical and economic philosophy is to endow the professional printshop with fine precision make-ready apparatus that controls pixel geometry in a direct geometrical fashion.

The high cost of each make-ready apparatus can be amortized over make-ready work for many different presses, many millions of printing impressions, and many years of service. The equipment which thus defines where and how much ink will be placed is ordinarily an entirely different apparatus from the equipment which thereafter actually places the ink.

When one more printed copy of the image is desired, the operators need only rotate the printing drum once more—the colorant placement is already defined by the printing plate. Even if another copy is desired after the plate has been recycled (i.e. destroyed), the identical colorant placement can be reestablished from the printing negatives. There is no need to revert to the original information source, whether it was a visible camera-ready master or an electronic image-data computer file.

(b) Incremental printing technology—Incremental printing, by comparison, mechanically defines and simultaneously marks pixels by an ingenious complex of:
moving hardware,
orthogonally moving print medium,
split-millisecond timing,
an inexpensive consumable component known as a "printhead" or (in inkjet printing) "pen", and
inks specially formulated to be amenable to ejection, flight and deposition without physical contact between hardware and medium.

In incremental printing each act, or operation, of mechanically defining a particular pixel thus serves—and instantaneously serves—one and only one application of colorant to the medium.

If another printed copy of the image is desired, the entire array of pixels must be mechanically redefined from scratch by the same hardware, the only commonality being the image-data computer file that defines informationally what the electromechanical hardware will later define mechanically. (As noted above, an information source is present in offset work too, but not normally consulted for each additional printout.)

Due to the extremely dynamic and transitory nature of this pixel-defining and -marking process—and particularly in view of the relatively humble and inexpensive printhead that is at the crux of this process—the resulting colorimetric tones are subject to significant variation. By the same token, however, the entire process at each point—being dynamic—is subject to pixel-wise control, and this point-by-point control is readily exploited to correct or compensate for undesired variation.

(c) Colorimetric nonlinearity—In particular, the variation just mentioned is often manifested in nonlinearity of tonal steps—in nominally linear calorimetric shadings. Linearity of tonal steps is extremely important to calorimetric accuracy.

Linearity is important not merely to the precise perceptible shade (e.g. lightness) of a single subtractive primary printed alone, but also to the hue and chroma of all complex shades formed by printing dots of the different primaries mixed together. Linearity in incremental printing requires, in effect, either:

(1) a very precise relationship between the size of each colorant dot and the size of each pixel that such a dot may occupy—or, alternatively, (2) an arithmetic adjustment to each input tonal value to accommodate imprecision in that relationship.

When the dot-to-pixel size relationship is correct, then a nominally linear geometrical sequence of activated-pixel fractions produces a similarly linear sequence of actual inking fractions—without any need for arithmetic adjustment. Accomplishing linearity in this way, however, would be prohibitively expensive because nonlinearity can arise from minute tolerances in any of a great number of operating parameters.

These include for example the electronic timing of dot-formation commands, and interactions between the printing medium and the colorant; and, in inkjet work, distance of inkdrop flight from printhead to printing medium, nozzle size and directionality, heater chamber size, and heater firing energy. The latter four factors affect inkdrop volume, which in turn influences both dot size and dot placement. All the parameters mentioned also directly affect colorant dot coalescence with nearby dots.

(d) Linearization procedures—Hence in a practical, economical sense high-quality printing with incremental systems and methods requires actual measurement of tonal-step linearity, and retention of linearization correction coefficients or the like for use in printing images thereafter. This kind of correction is known in the art, and may be effectuated by any of various techniques—some open-loop, others closed-loop.

Some such procedures are centered upon factory measurements for each individual printer, or for an entire line of printers. Others are based on measurements made in the field (i. e. after distribution of the product), either automatically by programmed systems in each printer or by procedures prescribed for performance by human operators of the equipment—or partly automatic, partly manual.

All linearization procedures necessarily rely, at some point in the cumulative history of the overall data, whether in factory or field, upon printing and measurement of a test pattern. Such measurement is followed by feed-back of measured errors as correction signals to color-adjusting stages in the printing system of the individual printer.

It is well known in this field that results of linearization are different when a printing system is using different inks, or different printing media—or both. Therefore, the system linearization procedure must be repeated whenever a new set of printheads (pens, in inkjet systems) is placed into service—and also whenever the print media are changed.

The printing and measurement procedures that are needed to accomplish the linearization, described above, necessarily consume both ink and printing medium—as well as time. Since linearization is fundamental to good image quality, however, these investments of resources are well spent.

(e) Linearization hardware—In the measurement phases of linearization, a reliable measuring device is required. This may be a high-quality calorimeter—for instance a freestanding one such as mentioned in the coowned U.S. Pat. No. 5,272,518 of Vincent, or a printer-mounted one such as taught in another coowned patent of Vincent, U.S. Pat. No. 5,671,059, or in the above-mentioned patent document of Thomas Baker.

A calorimeter is or can be made direct-reading in perceptual colorimetric space, such as the well-known CIELAB space. Such direct perceptual readout is very favorable, since it is in perceptual terms that a printing system ideally should be linearized.

Alternatively and much more economically, however, the measuring device can be a simple densitometer, or even a relatively crude optical sensor that is custom driven—and whose output signals are specially interpreted—to yield values that the Baker document terms "pseudodensito-metric" measurements. Such a device is especially favorable in a production-printer environment, for measurements to be made in the field after product distribution, because many or most sophisticated incremental printers already include such a sensor for other uses.

In particular a simple optical sensor—often denominated a "line sensor"—is provided for such purposes as pen alignment, and other strictly positional calibrations. (A representative application of such a sensor is taught in the Sievert patent document mentioned earlier.) In scanning printers, a line sensor ordinarily is mounted to the carriage that holds the printheads and scans them back and forth across the printing medium.

Actually for such usages a sensor need do little more than distinguish dark from light. This is accordingly the type of sensor that a calorimetric calibration module can, in effect, inherit from the general operations of an incremental printer.

The line sensor consists of a light source and an electrooptical detector. The source illuminates the print medium and whatever marks have been printed upon it, and the detector produces an electrical signal related to the light reflected from the medium and those marks. In practice the source is often a light-emitting diode, or in better units two such diodes emitting light of different colors so that the sensor can respond suitably to the several subtractive primary colorants used in printing.

(f) Fine linearization with modest equipment—The challenge then becomes how to infuse such a primitive device with an adequately close approximation to the high-quality measuring capabilities of a perceptual-reading calorimeter—or, more precisely, how to do so at minimal cost and complexity. It is conventional in the art of incremental printing to meet this challenge by calibrating the sensor itself, in perceptual terms, and storing the calibration data for use whenever a linearization is to be performed.

There have been several different overall approaches to providing such a calibration of the sensor. The calibration, at least in principle, can be performed either at the factory or in the field—but factory calibration is the only prior method which the present inventors know was actually commercialized:

If calibration is performed at the factory, the data for all media then known are stored in the printer memory and must be invoked—by media type—before linearization for any particular combination of media and inks or pens. Factory calibration is undesirable for several reasons that will be taken up shortly.

Commercialization of factory calibration for a line sensor has occurred in a Hewlett Packard printer/plotter. In that product the calibration was performed for a statistically significant number of different sensor units in production printers, and—from the resulting data—weighted-mean calibration values were adopted for the product line as a whole.

In one variant of this sensor-calibration strategy, different data sets have been acquired for different basic types of ink: pigment inks and dye inks respectively. In this case, different calibration values have still been adopted for the product line as a whole—but these values have been tabulated separately for the different ink types.

In another variant of the factory sensor-calibration strategy, different data sets have been acquired for different subpopulations of sensors. Such subpopulations arose from tolerances in the light sources, detectors and geometries of the sensors and diverged significantly in the conversion factors that they generated through the calibration process.

Accordingly in this case different calibration values were adopted for each subpopulation of sensors, rather than for the product line as a whole—but nevertheless as a matter of convenience, if preferred, all the different subpopulation sets could be stored in all the printers. This was particularly useful in case the sensor had to be changed after a printer has been distributed and is in the field, i. e. in an end-user's facility.

In any event, the calibration values were then saved in the printer memory for all the machines in the product line, and/or in some part of the product line carrying a particular respective sensor subpopulation. In all cases, separate calibration numbers were saved for each different printing medium.

As indicated above, although field calibration of the sensor has been possible in principle, the present inventors are not aware of any prior commercialization of that approach. If sensor calibration is performed in the field, then presumably it is done whenever a new set of colorants or printheads (or both) is placed in service—and also whenever a different type of printing medium is first placed in service.

Since we assume here that the printer is available for sensor calibration, one field-calibration strategy is to conserve printer memory space by calling for the calibration to be performed shortly before each linearization; then only one set of media data need be stored at any one time.

An alternative strategy is to simplify the operation or usage of the machine by storing many sets of media data—upon acquiring such data in the field—and then calling up a suitable set by media type, as in the factory sensor-calibration case.

In any event, after sensor calibration, as noted above, the system is ready to perform a linearization for the inks and medium then in use. It has been natural to perform such changes in calibration, like the linearization, for each different printing medium because in the linearization process—as also mentioned above—the sensor responded differently to test patterns printed on different media. In other words, the requirement to calibrate the sensor separately for each different printing medium was grounded in the requirement to linearize separately for each change of print medium.

(g) Drawbacks in conventional calibration—Unfortunately, regardless of which of the above-discussed approaches and strategies is adopted, several problems result:

First, when sensor calibration is performed in the factory any media introduced by the printer manufacturer after a particular printer has been distributed to an end-user—and third-party media as well—are absent from the media-data memory. This is a serious problem because special provision must then be made for use of such media, or the media are usable only without proper linearization.

Another serious problem is that calibration of a line sensor is not strictly accurate unless it is performed using the particular ink sets and printheads that will be used in the linearization and subsequent printing.

Yet another problem is that memory storage space in the printer must be dedicated to the calibration data. The amount of data, however, is modest and this problem is secondary.

Second, if sensor calibration is performed in the field (if in fact this has been done), while this mitigates the problem of third-party and postintroduction media—and as well the problem of inaccuracy due to calibration without actual inks and pens to be used—it does introduce other difficulties. Adoption of the first-mentioned field-calibration strategy (calibrating a sensor separately for each linearization) raises the end-user's inconvenience and expense:

Recalibration of the sensor after each media change (in addition to relinearization of the printing system after each media change, and also in addition to recalibration of the sensor after each ink-set or pen change) makes the overall process very time consuming, and somewhat expensive in materials cost as well.

This first field-calibration strategy generally doubles the time required for linearization alone. The dual process also consumes quantities of ink and printing medium, again roughly doubling the quantities expended for linearization only.

If instead the second-mentioned field-calibration strategy (of storing all the different media-data sets) is adopted, then the problems just discussed are somewhat reduced but still important if the user wishes to use several different media—particularly trying or switching to new media as they become available. Furthermore the objectionable cost of dedicated memory space arises again, as in the factory-calibration case.

Thus from the standpoint of a user of the system, a separate sensor calibration for each different type of medium—preliminary to relinearization—is extremely undesirable. What is desired is some more-efficient way to prepare for the necessary linearization.

(h) Dynamic-range adjustment—For purposes of this document it is important to distinguish another type of conventional sensor setting that is sometimes (though not in this document) called "sensor calibration", but is a much lower-level matter and strictly electronic rather than related to colorimetry (or even pseudodensitometry) as such. This is an automatic, routine and rapid procedure that is performed both in the field—i. e. in the facilities of an end-user—and in the factory.

It is performed before—usually just before—operation of each algorithm that will use the line sensor, in particular just before a linearization or a sensor calibration. Its purpose is basically to assure that there is enough optical signal on the sensor, and thereby enough electrical signal from the sensor.

This procedure prints a color patch on white paper for each ink color and calculates optimum electronics settings (gain and offset on the signal amplifiers) for each color on the given printing medium, and for the bare medium; however, as suggested above, this calibration has no direct relationship with color. For each patch and particularly for the bare medium, the LED current is raised until adequate signal appears—most typically eight or sixteen steps on the analog-to-digital converter ("ADC")—and then until the sensor signal saturates; and then the current is lowered slightly to establish suitable dynamic range.

The purpose of this procedure is only to optimize the ADC dynamic range, and improve the electronic signal-to-noise ratio, for a given printing medium and ink set. For purposes of this document, this procedure is not a "calibration" and will be called a "dynamic-range adjustment".

(i) Conclusion—As this discussion suggests, limitations in efficiency of preparing an incremental printer system for use continue to impede achievement of uniformly excellent inkjet printing that is within the constraints of acceptability to product buyers, owners and operators. Thus important aspects of the technology used in the field of the invention are amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is an automatic method of linearizing a color printing system, for forming images on plural printing media. The method uses measurements made with an optical sensor that is onboard the system.

The method includes the step of referring to a single calibration of the sensor; this calibration is used in common for substantially all the plural media. This single calibration, however, is with respect to exclusively a single one of the plural media. (In other words, when the calibration is actually performed, it is performed with respect to just one of the media.)

The method also includes the step of using the sensor, as calibrated by the single common calibration, to calorimetrically linearize the system for printing with each of plural colorants on any one medium, of the plural media. (In other words, the calibration although performed with respect to just one printing medium is then applied more broadly for linearization as to any of the media.) Yet another step is thereafter maintaining the system as thus linearized for printing on that one medium.

The foregoing may represent a description or definition of the first aspect or facet of the invention in its broadest or most general form. Even as couched in these broad terms, however, it can be seen that this facet of the invention importantly advances the art.

In particular, due to explicitly calibrating with respect to just one printing medium rather than many printing media, calibration by the invention consumes only a small fraction of the time, media and ink used conventionally. Therefore in comparison with conventional methods the invention offers much more favorable economics for maintaining good color calibration.

Although the first major aspect of the invention thus significantly advances the art, nevertheless to optimize enjoyment of its benefits preferably the invention is practiced in conjunction with certain additional features or characteristics. In particular, preferably the method also includes the step of repeating the using and maintaining steps for at least one other medium, of the plural media—and still more preferably for at least five others of the plural media.

Another basic preference is that the method include the step of, before the using step, performing the single common calibration using a particular one medium, of all the plural media, which has substantially greatest contrast between darkest full inking and unprinted area (this is the medium of broadest gamut). If this preference is observed then a subsidiary preference is that the performing step include these substeps:

providing a standard test pattern on the particular one medium, employing a calorimeter to find perceptual-space reflectances of the test pattern, operating the onboard optical sensor over the standard test pattern to obtain reflectance readings of the test pattern, and tabulating the perceptual-space reflectances of the test pattern as a function of the on-board-sensor reflectance readings.

Another basic preference is that the method also include the step of, before the using step, performing the single common calibration using a particular one medium. In this basic preference furthermore the performing step includes the same four substeps just enumerated.

If this basic preference is observed, then several subsidiary preferences apply. One such subsidiary preference is that the providing step include printing a ramp with the plural colorants. In this case a still further, nested, preference is that the ramp-printing comprises printing with exclusively the plural colorants taken singly.

A second subsidiary preference, within the four-sub-step basic preference under discussion but particularly for a sensor that incorporates at least one illuminator; is that—to stabilize illumination in the sensor—the operating substep include operating the at least one illuminator continuously before and during measurement of the ramps.

A third subsidiary preference within the four-substep basic preference is that the operating step include (1) operating a plurality of representative onboard optical sensors in a plurality of systems; and (2) obtaining a statistical measure of results for the plurality of sensors and systems, to use as the reflectance readings for calibration of like onboard sensors generally throughout a product line of the systems.

A fourth subsidiary preference is that the operating step include (1) operating a particular onboard optical sensor plural times in a single system, as part of factory processing of that system; and (2) obtaining a statistical measure of results for the plurality of operating times, to use as the reflectance readings for calibration of the particular onboard optical sensors in the single system.

A fifth subsidiary preference—alternative to the fourth—is that the operating step include (1) automatically operating the onboard optical sensor in facilities of an end-user of the system, as part of routine maintenance of that system; and (2) automatically using results obtained in the end-user facilities as the reflectance readings for calibration of the end-user's system.

A sixth subsidiary preference is that the operating step include (1) operating a plurality of representative onboard optical sensors in a plurality of systems; and (2) obtaining a statistical measure of results for the plurality of sensors and systems, to use as the reflectance readings.

Another basic preference is that the using step pro-vide CIELAB-space linearity in $\underline{b}$* for yellow, and in $\underline{L}$* for other colorants. Still another basic preference is that the using step include these substeps:

with each of the plural colorants respectively, printing a ramp of tonal patches at nominally specified tonal levels, using the calibrated onboard sensor to colorimetrically measure the ramps to determine actual tonal levels, and for each of the plural colorants respectively, determining corrections for subsequent application at each nominally specified tonal level to linearize actually printed tonal levels.

If this basic preference is in use, then some subsidiary or auxiliary preferences also are applicable.

In one such subsidiary preference, the using step includes measuring an unprinted area of the first medium as a reference white point for the linearizing. In another, the ramp-printing substep includes printing each respective ramp with negligible hue-angle variation along the ramp.

In still another such subsidiary preference—particularly for a sensor that incorporates at least one illuminator—to stabilize illumination in the sensor, the using substep comprises operating the at least one illuminator continuously before and during measurement of the ramps.

One further basic preference is that the said single calibration include plural subcalibrations for plural ink types respectively. In this case it is further preferred that the plural ink types respectively include pigment inks and dye inks.

In preferred embodiments of its second major independent facet or aspect, the invention is an automatic method of linearizing and then using a color printing system, to form a color image on any one of plural printing media. The method is based upon measurements made with an optical sensor that is onboard the system.

The method includes the step of referring to a single calibration of the sensor. The single calibration is with respect to exclusively a single one of the plural media—but is used in common for substantially all the plural media.

The method includes the step of using the sensor, as calibrated by the single common calibration, to colorimetrically linearize the system for printing with each of plural colorants on any one medium, of the plural media. Another included step is thereafter using the system without further sensor calibration to form a properly colorimetrically linearized image on any different one medium, of the plural media.

The foregoing may represent a description or definition of the second aspect or facet of the invention in its broadest or most general form. Even as couched in these broad terms, however, it can be seen that this facet of the invention importantly advances the art.

In particular, the advantage arising from this facet of the invention is complementary to the advancement noted above for the first aspect of the invention. For this second aspect, the benefits of economical calibration are extended from the context of the calibration procedure itself to the context of using a printer system to produce images of fine color quality.

Although the second major aspect of the invention thus significantly advances the art, nevertheless to optimize enjoyment of its benefits preferably the invention is practiced in conjunction with certain additional features or characteristics. In particular, of all the plural media, preferably the single one has greatest contrast between darkest full inking and unprinted area.

Another preference is particularly for use if the sensor incorporates at least one illuminator. In this preferred case, to stabilize illumination in the sensor the using substep includes operating the at least one illuminator continuously before and during measurement of the ramps.

Another preference is that the method further include the step of, before the using step, performing a dynamic-range adjustment.

In preferred embodiments of its third major independent facet or aspect, the invention is a printer. The printer is for forming images on plural printing media, and includes an optical sensor that is onboard the system.

The printer also includes first processor portions for performing a first program. The program operates the printer and sensor to develop a single calibration of the sensor. This calibration is with respect to exclusively a single one of such plural media, but is for use in common with substantially all of such plural media.

(In the accompanying claims generally the term "such" is used—instead of said or "the"—in the bodies of the claims, when reciting elements of the claimed invention, for referring back to features which are introduced in preamble as part of the context or environment of the claimed invention. The purpose of this convention is to aid in even more distinctly and emphatically pointing out which features are elements of the claimed invention, and which are parts of its context—and thereby to more particularly claim the invention.)

Also included are second processor portions for performing a second program. This program operates the printer, and the sensor as calibrated by the single common calibration, to colorimetrically linearize the system for printing with each of plural colorants on any one medium, of such plural media.

In addition the printer includes a memory for thereafter maintaining linearization data, for the printer as thus linearized, for printing on said any one medium, of the plural media. It will be understood that these recitations mean that the single common sensor calibration serves in linearization for printing on any one, not just some particular specially selected one, of the plural media.

The foregoing may represent a description or definition of the third aspect or facet of the invention in its broadest or most general form. Even as couched in these broad terms, however, it can be seen that this facet of the invention importantly advances the art.

In particular, this facet of the invention is in essence a hardware manifestation that is particularly advantageous for calibration of the sensor in the field. As explained earlier, a benefit of using just one sensor calibration for all media is that field calibration is not necessary; however, it may still be desirable in event the sensor must be changed, or if the system is to be used with newly introduced inks.

In the latter case, field calibration avoids the necessity of downloading information into the printer from the World-Wide Web or otherwise. Benefits of this third aspect of the invention essentially parallel those of the first and second aspects discussed earlier.

In preferred embodiments of its fourth major independent facet or aspect, the invention is an automatic method of calibrating an optical sensor and using the sensor to linearize a color printing system that forms images on plural printing media. This method includes the step of deriving a single sensor calibration from ideal properties of color inks, without making any optical measurement using the sensor.

It also includes the step of referring to the derived is single calibration, used in common for substantially all the plural media; and furthermore the step of using the sensor as calibrated by the single common calibration to colorimetrically linearize the system for printing with each of plural colorants on any one medium, of the plural media.

Another step is thereafter maintaining the system, as thus linearized, for printing on the one medium. The foregoing may represent a description or definition of the fourth aspect or facet of the invention in its broadest or most general form.

Even as couched in these broad terms, however, it can be seen that this facet of the invention importantly advances the art. In particular, this facet of the invention offers an extremely rapid and generalized way to get sensor-calibration data without any of the drawbacks of resorting to measurements.

Although the fourth major aspect of the invention thus significantly advances the art, nevertheless to optimize enjoyment of its benefits preferably the invention is practiced in conjunction with certain additional features or characteristics. In particular, the preferences introduced above as to each aspect of the invention are applicable to all the other facets too, including this fourth aspect.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. Sensor Calibration for all Media in Common

In prior incremental-printer products and procedures, as discussed in the "Background" section of this document, it has been conventional to use a line sensor and to provide a separate calibration of that sensor for use with each different printing medium. The present inventors are aware of prior Hewlett Packard commercial products that operated in this way, based upon factory calibrations common to a whole product line—and saved in the printer memory.

The media-dependent sensor calibrations (i. e. appropriate to particular media respectively) were to be invoked in preparation for each relinearization of the printing system—and this was possible only for media known to the printer manufacturer at the time of product distribution. These calibrations were also limited in accuracy because of the manufacturing tolerances in ink sets and printheads actually placed in service in the field.

The present invention eliminates both these handicaps—the limitation to media known and recognized in advance by the printer manufacturer, and also the ink-set/print-head accuracy limitation. This is accomplished by calibrating in the field.

If any commercial products previously employed field line-sensor calibration that was media dependent, the invention also eliminates the relatively onerous dual procedure (requirement to perform both sensor recalibration and relinearization) which would have been required in such products whenever linearization was needed due to media change. This is accomplished by relying upon one single, media-independent sensor calibration for all media.

As discussed in the earlier passage about the fourth aspect of the invention, and in subsection 8 below, an approximate calibration of the sensor can be obtained with no measurements at all. Preferred embodiments of the invention, however, do include actual physical measurements as described in all the other parts of this document.

The invention flows from recognition and confirmation that sensor calibration is relative, and that a calibration actually established using just one suitable printing medium is applicable to sensor use for other printing media. (Repetition of just the linearization for each medium remains a requirement, and is readily acceptable in comparison with the dual procedure discussed above.)

What constitutes a suitable medium for such a one-time calibration is straightforward. The medium ideally is the lightest-colored one of all printing media which an operator intends to use—thereby establishing for the sensor a calibrated operating range that encompasses all tones, or very nearly all tones, to be encountered in operation with all those media.

Requirements for sensor calibration flow from those for the linearization in which the sensor will be used. Linearization in preferred embodiments provides linearity in the L* dimension for the K, C and M ramps, and linearity in b* for the Y ramp.

This being so, the question becomes what the relationship is between the tone-ramp linearization and the reference white that is implicitly involved. Going back to the basic L*a*b* formulas, it can be clearly seen that if there are two different reference whites, in tristimulus coordinates $(X_0, Y_0, Z_0)$ and $(X_1, Y_1, Z_1)$ there are also two corresponding L*a*b* systems.

To pass from one system to the other, the X,Y,Z system can be used to connect the two. This can be done by back-solving the equations for each case.

To instead demonstrate that if a tone ramp is linearized in one system it is also linearized in the other, an effective algebraic strategy is to characterize small increments $\Delta L$, $\Delta a$, $\Delta b$ in the L*a*b* system in terms of the corresponding X,Y,Z variables. When this is done and the X,Y,Z expressions worked through for L* in particular, it will be found that a change in the reference white only scales the L* values by a constant.

This in turn implies that in the L* dimension linearization can be performed independently of the reference white that is used—i. e., the linerziation is media-independent. This clearly indicates that L* is a desirable parameter for use in linearizing a color ramp.

One meaningful reason to object to using L* is that it has a smaller range, as compared with a* or b*, for a particular colorant. This is in fact importantly so in the case of yellow.

Although the proof is somewhat more complicated and less strictly accurate, a closely analogous scaling-by-a-constant and media independence can be shown for the a* and b* dimensions. Based on such a demonstration, preferred embodiments of the present invention use b* for linearization of yellow.

These conclusions have been stated in terms of linearization. As suggested above, however, the same conclusions carry over to practical requirements for line-sensor calibration.

2. Dynamic Closed-Loop Color Calibration

For purposes of this document, to avoid confusion with the subject of the present patent document—namely, "calibration" of the line sensor—the phrase "color calibration" is limited to colorimetric linearization of an incremental printing system. This in turn, as suggested earlier, means developing and applying transfer functions to each of the printer's continuous-tone planes (typically CMYKcm) independently. The result is consistent print-to-print and printer-to-printer color.

Linearization that can be performed for any printing medium is essential for a printer manufacturer. It enables optimum image quality when a printer introduced by that manufacturer is used with third-party media—as well as with new, postintroduction media offered by the same manufacturer.

Sensor calibration in turn is critical to a good linearization, and the invention makes possible such calibration that is far more practical than heretofore. This invention is best incorporated into a closed-loop, dynamic form of overall color calibration and linearization.

In operation of preferred embodiments, the printer prints a test pattern—sometimes called a "target". The target is printed using a first, preliminary linearization and representatively contains four or six ramps of preferably sixteen patches of different amounts of ink, usually including one at maximum density.

One preferred form of pattern layout and scan procedure is taught in the patent document of Paul Soler et al. mentioned earlier; for present purposes, however, the intense concern as to stability reflected in that document is typically not required. Another preferred form of pattern layout and scan procedure is introduced in the first of the two earlier-mentioned patent documents of Francesc Subirada et al.

Each of the ramps is printed using a different one of the subtractive primary colorants available in the system. Refining the linearization for the particular combination of ink and printing medium, however, first requires a calibration of the line sensor.

3. Line-Sensor Calibration

There are fundamentally three ways in which this can be provided using the present invention:

a sensor calibration for the entire product line can be developed at the factory, measuring the response of a sizable number of the sensors and finding a suitable representative relation—such as a mean, or a weighted mean, etc.—and storing the sensor calibration data in a nonvolatile memory of each printer in the line;

a sensor calibration for the particular sensor in each individual printer can be developed at the factory, measuring the response of that sensor only—and again storing calibration information in a memory, but only a memory of that individual printer; or a sensor calibration for the particular sensor can be developed in the field, most typically in the end-user's facility—and ideally through operation of an automatic procedure programmed into the printer, or into an associated computer or raster-image processor ("RIP").

If desired, a particular printer may be provided with a sensor calibration through either of the first two methods but also with the necessary programming to update the calibration by the third method, from time to time as the system ages—most typically over a period of years—and the sensor may be expected to drift in its response.

These methods are also subject to the variants mentioned in subsection (f) of the earlier "BACKGROUND OF THE INVENTION" section of this document. Those relate to calibrations using different ink types or different sensor subpopulations.

In any of these methods, what is contributed by the present invention is relief from the need to calibrate, and store calibration data, for each of the possible print media that is to be used in the machine. To the contrary, according to the invention it is necessary to perform a calibration for only just one printing medium (ideally a carefully selected one, as noted earlier).

In simplest mechanical terms, the sensor calibration measurements—wherever and whenever they are made—consist of scanning the arrays of patches and performing computations on the signals from the sensor. These computations derive needed transfer-function coefficients that characterize the sensor itself.

These measurements-and consequent computations are closely analogous to those that make up the system linearization which then follows. There are, however, important differences, and constraints:

linearization must be performed for each combination of ink and printing medium;

sensor calibration, according to the present invention, must be performed for each ink set but not for each printing medium;

the linearization process requires that the sensor calibration be done first;

the sensor calibration process requires an already linearized, printed test pattern;

such a test pattern cannot be printed, on the particular printer to be linearized, before the sensor calibration is done.

Therefore it is necessary to use a previously printed test pattern—made either with some other printer that was well linearized at the time, or with the same printer earlier when it was linearized. For instance, a preprinted test pattern may be supplied from the factory, with the printer; however, such targets may be subject to degradation, particularly if not kept sealed away from air and out of the light.

If the sensor response itself is linear, then it can be shown mathematically that a sensor calibration made using one print medium is good for all other print media of equal or lesser lightness. In practice, however, even if the sensor response itself is not linear—in particular, if the output is equal to the input raised to some power that is not equal to one (unity)—then such nonlinearity can be subsumed within the sensor calibration.

This is true only if the nonlinearity is not overly strong, e. g. if a nonunity exponent is close to unity. If a stronger or more complicated nonlinearity is present, it may interfere with orderly interpolation.

More specifically, whether for linearization or for sensor calibration, the line-sensor readings are first used to find normalized values. The present inventors use the terms "absolute contrast ratio" ("ACR") for the normalized black-ink ramp measurement signals, and "local contrast ratio" ("LCR") for the chromatic ink ramps.

Derivation of ACR and LCR is shown in sections 6 and 7 below. (These variable names are used in the present document somewhat differently than in some of the other patent documents mentioned earlier.)

If it is sensor calibration that is being performed, then nothing has just been printed; rather, the sensor has measured known-linear patterns of known tonal values. The ACR and LCR (normalized sensor readings, as above) are compared with known correct perceptual readings of a CIELAB colorimeter.

Again, the departures are effectively inverted to develop conversion factors (or terms). The system can then rely upon sensor readings as equivalent to CIELAB values, when performing linearization as described below.

Preferably the conversion numbers are stored in the printer memory in the form of lookup tables, for quick application to input tonal values in each plane—most usually with one interpolation stage. If desired, however, it is possible to instead develop a correction function, for instance using spline techniques, for use in calculating CIELAB values from the sensor-signal normalized ACR and LCR numbers.

Once again, according to the present invention, just one sensor calibration does suffice for all media. on the other hand, regardless of which form of correction is preferred, it is helpful to have one set of sensor-calibration values for each type of ink.

In principle a single calibration may be made to suffice for all inks as well. For future convenience, however, because the character of inks to be introduced in the future cannot be foretold as well as the character of media to be introduced in the future—and because interaction of the sensor with different inks is usually somewhat more complex than with different media—it is not advised to attempt such a strategy.

4. System Linearization

On the other hand, if it is linearization that is being performed, the ACR and LCR numbers from the sensor are translated into perceptual (preferably CIELAB) values. True colorimetric linearity of the printed test patterns can then be evaluated.

Measured departures from desired linearity are next in effect inverted to develop linearizing adjustments for application to tonal values expressed in image data. When these adjustments are applied, the printing system thereby is actually instructed to produce tonal values slightly higher or lower than truly desired.

In other words, in effect deliberate errors are introduced. This is done, however, in the knowledge that these deliberate errors and the nonlinearities present in the system will counteract one another, thereby producing correct tones.

The linearization includes generation of, most preferably, nine-bit transfer functions and also error-diffusion thresholds (analogously to the procedure introduced in the patent document of Bockman and Li mentioned earlier). These intermediates are applied to color signals just before or during halftoning—below the printer-language level, and invisible to conventional operations in that language.

This last point is true whether the printer-language pipeline in use is for instance PostScript®, HPGL or RTL. Accordingly the same linearization can be used in any such printer language pipeline, a capability which represents another favorable innovation.

A separate linearization should be performed for each combination of ink and media. It is not suggested that only one linearization can suffice for all media, or for all inks.

Starting without a prelinearized system, linearity measurements suggest a mean nonlinearity of roughly 3 dE, and maximum of about 7 dE. (The units "dE" represent a well-known measure of small distances in three-dimensional perceptual color space.) Starting instead from a prelinearized system, these values can be reduced to approximately 1 dE average, and 2 to 3 dE maximum.

5. Further Line-Sensor Calibration Details

Practice of the present invention does not require any deep familiarity with theoretical analysis of measurement systems, or with calorimetric principles, although the present inventors have performed such analysis and are familiar with those principles. One particularly advantageous characteristic of the invention is that it can be straightforwardly practiced on the basis of only the general descriptions presented in this document.

Some generalities found through the inventors' analysis and system design, and useful in obtaining perspective for practice of the invention, are these:

The line sensor can be characterized as a linear system.
This result is of central importance to the present invention, for it is what enables sensor calibration with just one single printing medium to serve for all media. As suggested above, small or smoothly varying nonlinearities in the sensor response are tolerable—and in fact simply become part of the overall variation for which the sensor calibration accounts.

The typical sensor is a broadband device.
Preferred sensors for use in this field are sensitive over the entire visible spectrum, though not uniformly. A representative line sensor in a printer has maximum response in the infrared.

Economical sensor illuminants are ordinarily LEDs, currently a pair: one amber, one blue.
These sources together provide an adequate approximation to white light—for maximum response in sensing the relative tonal values of the subtractive-primary and black inks ordinarily used in incremental printing. Operating the two sources simultaneously is useful for best stability.

Such simultaneous operation, however, does require high-quality electronics (including an analog-to-digital conversion stage with very high dynamic range). This requirement arises because most measurements are made on a high signal pedestal—due to the presence of light from both sources.

That condition obtains even when just one source is providing critical illumination for measurement of a particular colorant. (Further details appear in the above-mentioned patent document of Pau Soler et al.)

Equalization of the two LEDs is very desirable.
The idea of "equalization" means that a calibration is performed to establish a "virtual" third LED that has roughly constant optical output power along its range of supply currents. Here is an example:

| LED current | LED optical power (mW) | | |
|---|---|---|---|
| (mA) | blue | amber | total |
| 10 | 20 | 5 | 25 |
| 20 | 60 | 10 | 70 |
| 30 | 100 | 15 | 115 |
| gain (mW/mA): | 4 | 0.5 | 4.5 |
| offset (mW): | −20 | 0 | −20 |

This tabulation shows that if the same supply current is applied to both LEDS, different parts of the spectrum have different optical power—and different power gains per unit of added supply current.

The differing power responses of the two LEDs makes the unbalance, as between the two spectral regions, different for each current level. Therefore it is preferable not to apply the same current to both LEDs; instead they should receive different current flows.

It is possible to calculate what current to apply to both LEDS to make the power on both spectra grow at the same rate. The less powerful (the amber) LED can be taken as a reference.

To give the more powerful (blue) LED the same output-power sensitivity, whatever current-growth steps are needed for the amber are scaled down for the blue. The current growth is lowered in proportion to the ratio of the two gains—i. e. in proportion to 4/0.5=8.

For example, suppose a current step of 10 mA (leading to a 5 mW power step) is needed in amber. The blue LED current instead can step by only 10/8=1.25 mA (also leading to a 5 mW power step, matching the amber).

In addition it is also desirable to select parts of the operating ranges (particularly including starting offset points) of both LEDs over which the current and corresponding power values retain about the same (or other compatible) relationships. As one exemplary solution, the current and power may be:

| virtual LED | | amber LED | | blue LED | |
|---|---|---|---|---|---|
| mA | mW | mA | mW | mA | mW |
| 10 | 13 | 10 | 5 | 7 | 8 |
| 20 | 23 | 20 | 10 | 8¼ | 13 |
| 30 | 33 | 30 | 15 | 9½ | 18. |

A proportional part (allowing for the different start values) of the current passing through the amber unit can be tapped off for the blue. Here the gain is 1 mW/mA for the virtual LED.

Adequate sensor stabilization requires accommodating warmup of the LEDs.

In particular, the illumination they emit—and accordingly the reflection from the test pattern, and the corresponding signal generated by the sensor—varies with temperature. Temperature affects both the overall light-emission efficiency and the spectral distribution (including the peak wavelength) of each diode. To bring these factors under control, before beginning actual measurements the LEDs should be operated for a period of time necessary to stabilize their temperature.

6. Definition and Determination of A. C. R. Values

The previously mentioned ACR and LCR, as these are used in the present document, are useful intermediate variables that conveniently relate raw data from the line sensor to perceptual measures of tonal values in the test-pattern ramp for each colorant plane. As suggested earlier, these perceptual measures may be acquired for use to indicate the ability of either:

the sensor, to read a standard, correct test pattern accurately—in perceptual terms; or the printer, to make a correct test pattern.

In either case, the ACR is a normalized form of the raw data readings from the sensor. For a reference "white" (for example, the bare unprinted printing medium), the maximum ACR will be that of the medium itself (100% ACR) and the minimum will occur when all power for all wavelengths in the illumination is absorbed (0% ACR) by an absolute black colorant.

ACR accordingly can be defined, for a particular color tone measured by the sensor, as a quotient of reflected light power $P_{ABS}$ vs. the incident power $P_{INC}$—again, taking into account all the desired spectrum for a wavelength range:

$$ACR = \frac{P_{REF}}{P_{INC}}.$$

For normalization purposes, however, the power reflected from a particular color tone patch should first be corrected for an offset that is due to the sensor yielding a nonzero reading when the light reaching it can be assumed to be zero:

$$P_{REFL} = P_{PATCH} - P_K.$$

The incident power $P_{INC}$ is a special case of this same expression, obtained when there is no printed patch, so that reflection is maximum—the value $P_{MED}$ received from the bare unprinted printing medium:

$$P_{INC} = P_{MED} - P_K.$$

Here $P_{INC}$ is represented simply as the maximum possible value of reflected light power, which is to say the difference between the sensor readings of power reflected from the print medium $P_{MED}$ and from an absolute black colorant $P_K$.

Inserting into the expression given above for the ACR:

$$ACR = \frac{P_{PATCH} - P_K}{P_{MED} - P_K}.$$

Taking the sensor measurement signals M as proportional (within small nonlinearities as mentioned earlier) to the power values P, the ACR can therefore be expressed directly in terms of the sensor signals M.

The various proportionality factors implicit in the relationship between M and P—such as in particular the effective area over which the light is collected through the sensor field of view—cancel out, leaving the conclusion that ACR can be measured directly for any triad of light reflected from (1) a particular patch, (2) paper "white" and (3) absolute black:

$$ACR = \frac{M_{PATCH} - M_K}{M_{MED} - M_K}.$$

As a practical matter, however, the line-sensor measurement signals M indicated here are advantageously taken making several samples of the sensor signal—ordinarily on the order of ten samples—and averaging them. As suggested earlier, it is important that the average satisfy thermal-stabilization criteria.

7. Definition and Determination of L. C. R. Values

The concept of ACR, as shown in the previous section, is analogous to having an absolute-referenced measurement. Such a derivation is directly applicable to black, because black always absorbs almost all of the visible spectrum, and in particular absorbs all the LED power independently of the spectral balance of that power.

This assumption fails for the chromatic colorants CMY, whose absorption depends strongly on the spectral balance of the LEDs. Referred to the absorption of absolute black, the value varies depending on the spectrum of the diodes, and so disrupts the line-sensor independence that is pursued here.

Figure 1:
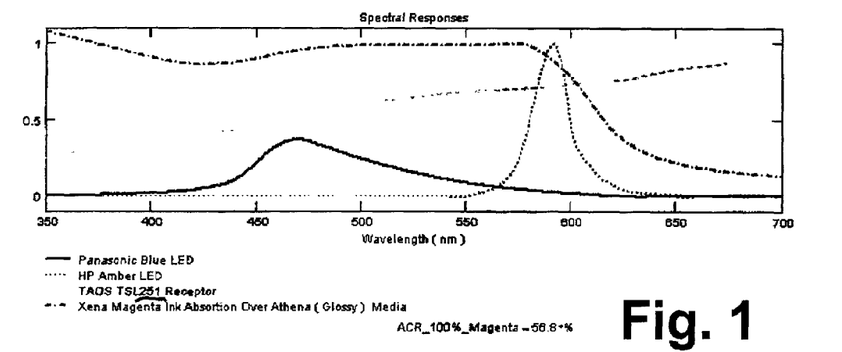
FIG. 1 is a graph of local contrast ratio for magenta ink, using a Panasonic® blue LED and a Hewlett Packard amber LED (as well as a TAOS® TSL251 receptor)
Figure 2:
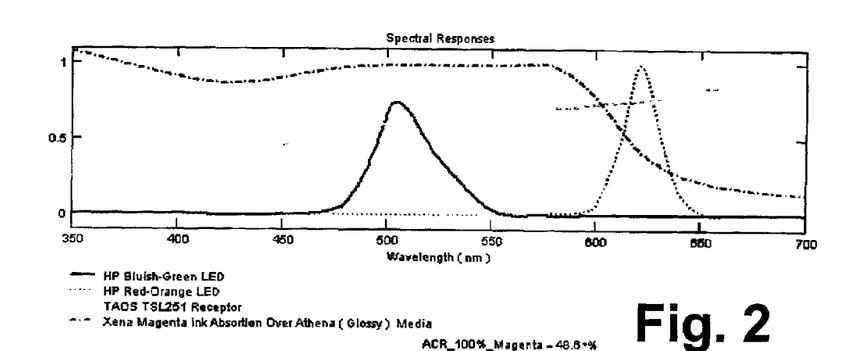
FIG. 2 is a like graph but using instead two Hewlett Packard LEDs—one bluish-green and another red-orange (and the TAOS unit too)

There cannot exist one lookup table that relates sensor readings to CIELAB for all possible sensors. The dependence, moreover, can be affected by spectral variation among LEDs of different standard types (FIG. 1) and some alternative types (FIG. 2).

The illustrations exhibit variation in the 100%-of-magenta ACR, amounting to a divergence of roughly eight percent in this concrete case. Self-warming spectral variation still further complicates the response for the chromatic color inks.

For robustness relative to this LED spectral variation for all the colors other than black, LCR can be defined analogously to ACR but taking as reference 100% of the ink color rather than 100% of absolute black. Thus with $M_{N\,MAX}$ the maximum sensor response for-color-plane "N" (e. g. one of the chromatic colorants CMY, or in some systems the dilute colorants cm, etc.), the LCR is:

$$LCR = \frac{M_{PATCH} - M_{NMAX}}{M_{MED} - M_{NMAX}}.$$

It can be shown that the ACR measurements are the fundamental basis for dynamic closed-loop color, using the invention, while LCR is just a derivative from it. Familiarity with the derivation, however, is not necessary to effective practice of the present invention. The relation can be written:

$$LCR_{ACTUAL} = 1 - \frac{1 - ACR_{ACTUAL}}{1 - ACR_{MAXIMUM}}.$$

In this expression, $ACR_{actual}$ is found from the previous expression for ACR in terms of $P_{PATCH}$ or $M_{PATCH}$—but evaluated for an intermediate tonal value of one of the chromatic-color inks—while $ACR_{MAXIMUM}$ is seen in the previous expression for ACR, evaluated for 100% of that color.

8. Sensor Calibration Tables from Ideal Inks

Procedures for sensor calibration based on actual measurements have been described above, particularly in subsections 1, 3, and 5 through 7 of this Detailed Description. Those procedures are particularly useful in obtaining sensor-to-CIELAB conversions that are fully adapted to the spectral behavior of actual inks, as distinguished from ideal colorants.

Achieving such a full adaptation to real-world inks is a main reason for preparing tables specific to each ink. It is possible, however, to establish fairly workable sensor-to-'LAB conversions based on ideal relationships.

The idea is to establish a relationship between the ACR and LCR variables and the L*a*b* system. For a particular primary (e. g. magenta), if a path is defined from that color to white, then it is possible to map, for that specific color, a relationship between the ACR and the L*a*b* of that color ramp.

As an example, this task has been performed using Adobe Photoshop® graphics program. Color ramps were defined going from white to each primary KCMY, and then the L*a*b* "measurements" were taken for each ramp patch using the same Photoshop program.

Figure 3:
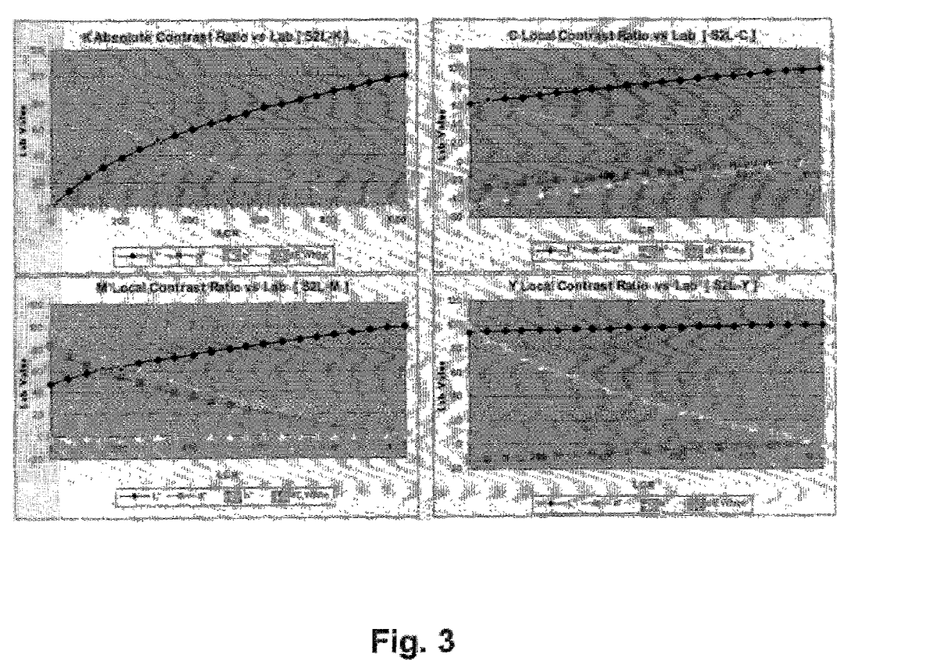
FIG. 3 is a group of four graphs showing perceptual-color-space parameters corresponding to absolute and local contrast ratios, as derived on the basis of ideal inks—without measurement, in keeping with the above-mentioned fourth main facet of the invention.

The resulting values constitute the sensor-to-LAB tables for each color. Data (FIG. 3) in these tabulations, although of course inaccurate because they do not account at all for true spectral properties of actual inks, are usable.

9. Hardware and Program Implementation

As the invention is amenable to implementation in, or as, any one of a very great number of different printer models of many different manufacturers, little purpose would be served by illustrating a representative such printer. If of interest, however, such a printer and some of its prominent operating subsystems can be seen illustrated in several other patent documents of the assignee, Hewlett Packard—such as for example the previously mentioned document of Thomas Baker, which particularly illustrates a large-format printer-plotter model.

(a) General mechanics and electronics—In some such representative printers, a cylindrical platen 241 (FIG. 4)—driven by a motor 242, worm and worm gear (shown as encircling the platen 241) under control of signals from a digital electronic processor 71—rotates to drive sheets or lengths of printing medium 4A in a medium-advance direction. Print medium 4A is thereby drawn out of a supply of the medium and past the marking components that will now be described.

Figure 4:
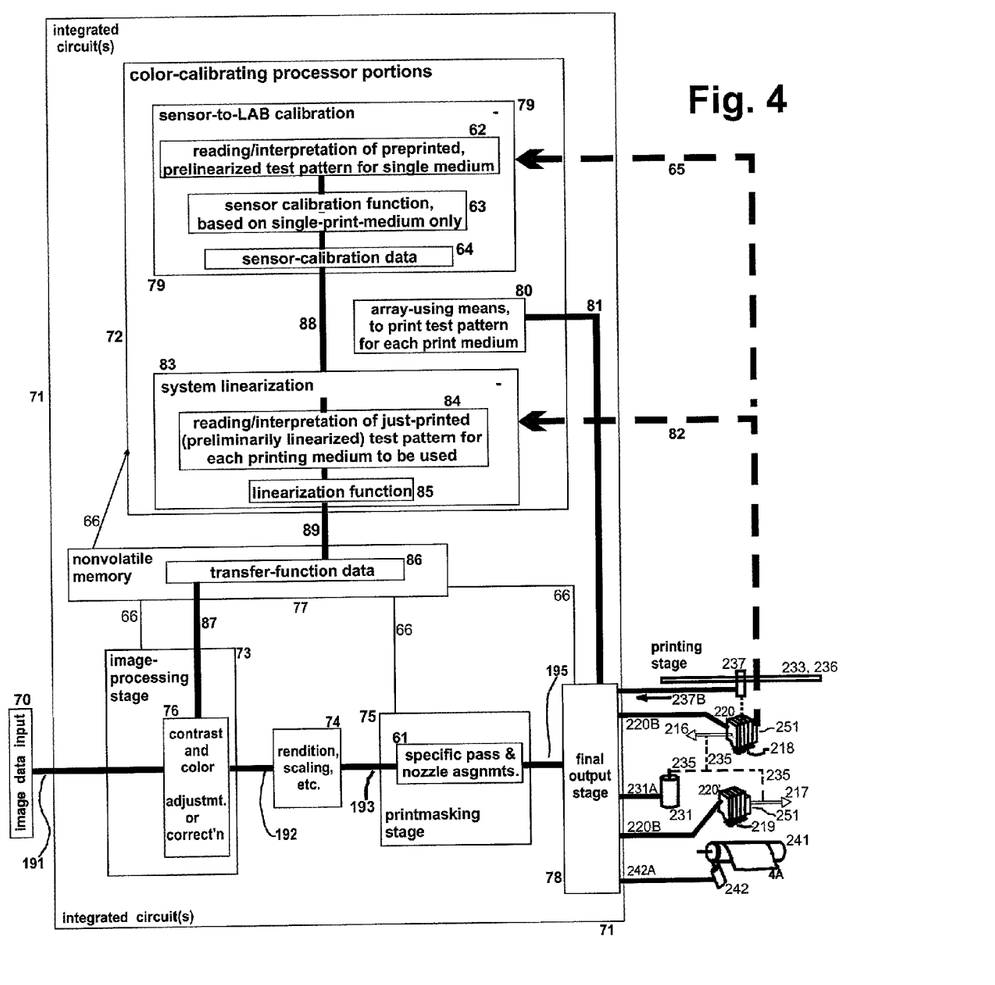
FIG. 4 is a block diagram, highly schematic, representing hardware (including programmed circuitry) in a preferred embodiment of the invention.

A pen-holding carriage assembly 220 carries several pens, as illustrated, back and forth across the printing medium, along a scanning track—perpendicular to the medium-advance direction—while the pens eject ink. For simplicity's sake, only four pens are illustrated; however, as is well known a printer may have six pens or more, to hold different colors—or different dilutions of the same colors as in the more-familiar four pens. The medium 4A thus receives inkdrops for formation of a desired image.

A very finely graduated encoder strip 233, 236 is extended taut along the scanning path of the carriage assembly 220 and read by a very small automatic optoelectronic sensor 237 to provide position and speed information 237B for one or more microprocessors 71 that control the operations of the printer. One advantageous location (not shown) for the encoder strip is immediately behind the pens.

A currently preferred position for the encoder strip 233, 236 (FIG. 4), however, is near the rear of the pen carriage—remote from the space into which a user's hands are inserted for servicing of the pen refill cartridges. For either position, the sensor 237 is disposed with its optical beam passing through orifices or transparent portions of a scale formed in the strip.

The pen-carriage assembly 220, 220' is driven in reciprocation by a motor 231—along dual support and guide rails (not shown)—through the intermediary of a drive belt 235. The motor 231 is under the control of signals 231A from the processor or processors 71.

Preferably the system includes at least four pens holding ink of, respectively, at least four different colors. Most typically the inks include yellow Y, then cyan C, magenta M and black K—in that order from left to right as seen by the operator. As a practical matter, chromatic-color and black pens may be in a single printer, either in a common carriage or plural carriages.

Also included in the pen-carriage assembly 220, 220' is a tray carrying various electronics. FIG. 4 most specifically represents a system such as the Hewlett Packard printer/plotter model "DesignJet 2000CP", which does not include the present invention. These drawings, however, also illustrate certain embodiments of the invention, and—with certain detailed differences mentioned below—a printer/plotter that includes preferred embodiments of the invention.

Before further discussion of details in the block diagrammatic showing of FIG. 4, a general orientation to that drawing may be helpful. This diagram particularly represents preferred embodiments of one previously discussed apparatus aspect of the invention.

Conventional portions of the apparatus appear as the printing stage 220 . . . 251, and 4A, discussed above, and also the final output-electronics stage 78 which drives that printing stage. This final-output stage 78 in turn is driven by a printmasking stage 75, which allocates printing of ink marks 218, 219 as among plural passes of the carriage 220, 220' and pens across the medium 4A.

Also generally conventional are a nonvolatile memory 77, which supplies operating instructions 66 (many of which are novel and implement the present invention) for all the programmed elements; an image-processing stage 73, rendition-and-scaling module 74; and color input data 70 seen at far left in the diagram. The data flow as input signals 191 into the processor 71.

Features particularly related to the apparatus aspect of the invention appear in the upper and upper-central region of the diagram as element 72, and elements 80 through 89; these will be detailed below. Given the statements of function and the diagrams presented in this document, a programmer of ordinary skill—if experienced in this field—can prepare suitable programs for operating all the circuits.

The pen-carriage assembly is represented separately at 220 when traveling to the left 216 while discharging ink 218, and at 220' when traveling to the right 217 while discharging ink 219. It will be understood that both 220 and 220' represent the same pen carriage, with the same pens.

The previously mentioned digital processor 71 provides control signals 220B, 220'B to fire the pens with correct timing, coordinated with platen drive control signals 242A to the platen motor 242, and carriage drive control signals 231A to the carriage drive motor 231. The processor 71 develops these carriage drive signals 231A based partly upon information about the carriage speed and position derived from the encoder signals 237B provided by the encoder 237.

(In the block diagram all illustrated signals are flowing from left to right except the information 237B, 65 fed back from the sensors 237, 251—as indicated by the associated leftward arrows—and analogously the previously mentioned information 66 where shown passing to the calibrating means 72, in a nonstandard direction.) The codestrip 233, 236 thus enables formation of color inkdrops at ultrahigh precision during scanning of the carriage assembly 220 in each direction—i. e., either left to right (forward 220') or right to left (back 220).

The invention is not limited to operation in four-colorant systems. To the contrary, for example six-colorant "CMYKcm" systems including dilute cyan "c" and magenta "m" colorant are included in preferred embodiments.

The integrated circuits 71 may be distributive—being partly in the printer, partly in an associated computer, and partly in a separately packaged raster image processor. Alternatively the circuits may be primarily or wholly in just one or two of such devices.

These circuits also may comprise a general-purpose processor (e. g. the central processor of a general-purpose computer) operating software such as may be held for instance in a computer hard drive, or operating firmware (e. g. held in a ROM 77 and for distribution 66 to other components), or both; and may comprise application-specific integrated circuitry. Combinations of these may be used instead.

The novel features appear primarily in the color-calibrating processing portions 72—which include a two-stage interpretive system 79, 83. Also novel in this context is a module 80 for controlling the final output stage 78 and printing stage 220 . . . 251, and 4A, to generate a test pattern for interpretation by the second (linearization) stage 83.

(b) Sensor-to-perceptual calibration—In first operation of the calibrating portions 72, the system scans the line sensor—which is another small optical sensor 251 that also rides on the carriage—over a preprinted test pattern known to be linear. This sensor is detailed in the previously mentioned patent document of Soler (see FIG. 5 and discussion in that document).

The result is a signal stream 65 from the sensor 251 to the first stage 79, which calibrates the sensor (as distinguished from linearizing the printing system). This stage 79 includes a front end 62 that reads and preinterprets the known-linear test pattern—and as earlier explained does so for only one single printing medium.

Based on the interpreted data, the main section 63 of the first-stage calibration module 79 determines conversion factors at multiple points—or a spline-like function, as mentioned earlier. Resulting calibration data are stored in a memory 64; as a practical matter, this memory may be part of the nonvolatile memory 77.

Calibration of the sensor is thus completed. The calibration data remain in the memory 64 for use until the sensor requires recalibration due to changing of the sensor, or its aging, or accumulated ink spray on its optical window, or other events that may be suspected to modify the actual response of the sensor and so require a new calibration.

(c) Printing-system linearization—Next, for actual linearization of the printing system—now relying on the already-calibrated sensor—the control module 80 provides signals 81 to the final output stage 78, inducing that stage to operate the printing stage 220 . . . 251, and 4A, to generate a new test pattern. This test pattern is not known to be linear, and in fact the purpose of printing it is specifically to determine its nonlinearities and a transfer function required to essentially eliminate them.

Unlike the single test pattern used for the sensor calibration described above, the linearization test pattern now under discussion should be printed on each different printing medium that is to be used in the printer. Of course it is not necessary if the operator is not concerned with tonal linearity in some particular project.

It also is not necessary to perform such printing and linearization for all the printing media at one time. Rather, these operations can be performed when a particular type of print medium is about to be used for the first time, or after this type of medium has not been used for a long while—and also if the printheads or inks have been changed.

After the new test pattern has been printed, then again the sensor 251 is scanned over the pattern as in the sensor calibration—but resulting data 82 from the sensor now flow to the second, linearization stage 83 of the calibration module 72. Here the data are interpreted 84 in an analogous manner to that in earlier module 62, but the interpretive calculations are aimed not at conversion factors for use of the sensor but rather at determining errors of linearization in the pattern.

From those errors, the next submodule 85 develops a linearization profile, or transfer function, that will later be used to adjust input color data to achieve printout linearity. Still within the processor 71 and at the output stage of its calibrating unit 72, this linearization submodule 85 transmits the adjustment data 89 into the previously mentioned nonvolatile memory 77 for storage in a transfer-function memory bank 86.

In this process, one or more of various forms of the transfer-function information 89—whether in the form of coefficients for use in a formula, or in the form of a lookup table—are then stored in their particular dedicated portion 86 of the memory 77. The transfer-function information is retrieved from that memory bank 86 and passes 87 into the color-adjustment module 76, whenever needed to guide the operation of that module in preparing the input data 70 for later transformations 74, 75, 78 and thereby for eventual printing in the printing stage.

The above disclosure is intended as merely exemplary, and not to limit the scope of the invention—which is to be determined by reference to the appended claims.

What is claimed is:

1. An automatic method of linearizing a color printing system, using measurements made with an optical sensor that is onboard the system, for forming images on plural printing media; said method comprising the steps of:
referring to a single calibration, used in common for substantially all the plural media, of the sensor; said single calibration being with respect to exclusively a single one of the plural media;
using the sensor, as calibrated by the single common calibration, to calorimetrically linearize the system for printing with each of plural colorants on any one medium, of the plural media; and
thereafter maintaining the system as thus linearized for printing on said one medium.

2. The method of claim 1, further comprising the step of:
repeating the using and maintaining steps for at least one other medium, of the plural media.

3. The method of claim 1, further comprising the step of:
repeating the using and maintaining steps for at least five others of the plural media.

4. The method of claim 1, further comprising the step of:
before the using step, performing the single common calibration using a particular one medium, of all the plural media, which has substantially greatest contrast between darkest full inking and unprinted area.

5. The method of claim 4, wherein the performing step comprises the substeps of:
providing a standard test pattern on the particular one medium;
employing a colorimeter to find perceptual-space reflectances of the test pattern;
operating the onboard optical sensor over the standard test pattern to obtain reflectance readings of the test pattern; and
tabulating the perceptual-space reflectances of the test pattern as a function of the onboard-sensor reflectance readings.

6. The method of claim 1, further comprising the step of:
before the using step, performing the single common calibration using a particular one medium; and wherein the performing step comprises the substeps of:
providing a standard test pattern on the one medium;
employing a colorimeter to find perceptual-space reflectances of the test pattern;
operating the onboard optical sensor over the standard test pattern to obtain reflectance readings of the test pattern; and
tabulating the perceptual-space reflectances of the test pattern as a function of the onboard-sensor reflectance readings.

7. The method of claim 6, wherein:
the providing step comprises printing a ramp with said plural colorants.

8. The method of claim 7, wherein:
the ramp-printing comprises printing with exclusively said plural colorants taken singly.

9. The method of claim 6, for a sensor that incorporates at least one illuminator; and wherein:
to stabilize illumination in the sensor, the operating substep comprises operating the at least one illuminator continuously before and during measurement of the ramps.

10. The method of claim 6, wherein the operating step comprises:
operating a plurality of representative onboard optical sensors in a plurality of systems; and
obtaining a statistical measure of results for the plurality of sensors and systems, to use as said reflectance readings for calibration of like onboard sensors generally throughout a product line of the systems.

11. The method of claim 6, wherein the operating step comprises:
operating a particular onboard optical sensor plural times in a single system, as part of factory processing of that system; and
obtaining a statistical measure of results for the plurality of operating times, to use as said reflectance readings for calibration of the particular onboard optical sensors in the single system.

12. The method of claim 6, wherein the operating step comprises:
automatically operating the onboard optical sensor in facilities of an end-user of the system, as part of routine maintenance of that system; and
automatically using results obtained in the end-user facilities as said reflectance readings for calibration of the end-user's system.

13. The method of claim 6, wherein the operating step comprises:
operating a plurality of representative onboard optical sensors in a plurality of systems; and
obtaining a statistical measure of results for the plurality of sensors and systems, to use as said reflectance readings.

14. The method of claim 1, wherein:
the referring step comprises referring to a single sensor calibration prepared using a graphics program, without optical measurements, from mathematical relationships among perceptual color-space parameters and tristimulus functions, for ideal inks.

15. The method of claim 1, wherein:
the using step provides CIELAB-space linearity in b* for yellow, and in L* for other colorants.

16. The method of claim 1, wherein the using step comprises the substeps of:
with each of the plural colorants respectively, printing a ramp of tonal patches at nominally specified tonal levels;
operating the calibrated onboard sensor to colorimetrically measure the ramps to determine actual tonal levels; and
for each of the plural colorants respectively, determining corrections for subsequent application at each nominally specified tonal level to linearize actually printed tonal levels.

17. The method of claim 16, wherein:
the operating step comprises measuring an unprinted area of said any one medium, of the plural media, as a reference white point for the linearizing.

18. The method of claim 16, wherein:
the ramp-printing substep comprises printing each respective ramp with negligible hue-angle variation along the ramp.

19. The method of claim 16, for a sensor that incorporates at least one illuminator; and wherein:
to stabilize illumination in the sensor, the operating substep comprises operating the at least one illuminator continuously before and during measurement of the ramps.

20. The method of claim 1, wherein:
said single calibration comprises plural subcalibrations for plural ink types respectively.

21. The method of claim 20, wherein:

said plural ink types respectively comprise pigment inks and dye inks.

22. An automatic method of linearizing and then using a color printing system, based upon measurements made with an optical sensor that is onboard the system, to form a color image on any one of plural printing media; said method comprising the steps of:

referring to a single calibration, used in common for substantially all the plural media, of the sensor; said single calibration being with respect to exclusively a single one of the plural media;

using the sensor, as calibrated by the single common calibration, to calorimetrically linearize the system for printing with each of plural colorants on any one medium, of the plural media; and thereafter using the system without further sensor calibration to form a properly calorimetrically linearized image on any different one medium, of the plural media.

23. The method of claim 22, wherein:

of all the plural media, said single one has greatest contrast between darkest full inking and unprinted area.

24. The method of claim 22, further comprising the step of:

before the using step, performing a dynamic-range adjustment.

25. The method of claim 22, for a sensor that incorporates at least one illuminator; and wherein:

to stabilize illumination in the sensor, the using step comprises operating the at least one illuminator continuously before and during measurement of the ramps.

26. A printer for forming images on plural printing media; said printer comprising:

an optical sensor that is onboard the system;

first processor portions for performing a first program that operates the printer and sensor to develop a single calibration of the sensor with respect to exclusively a single one of the plural media, but for use in common with substantially all the plural media;

second processor portions for performing a second program that operates the printer, and the sensor as calibrated by the single common calibration, to colorimetrically linearize the system for printing with each of plural colorants on any one medium, of the plural media; and a memory for thereafter maintaining linearization data, for the printer as thus linearized, for printing on said any one medium, of the plural media.

27. An automatic method of calibrating an optical sensor and using the sensor to linearize a color printing system that forms images on plural printing media; said method comprising the steps of:

deriving a single sensor calibration from ideal properties of color inks, without making any optical measurement using the sensor;

referring to the derived single calibration, used in common for substantially all the plural media;

using the sensor as calibrated by the single common calibration to calorimetrically linearize the system for printing with each of plural colorants on any one medium, of the plural media; and thereafter maintaining the system as thus linearized for printing on said one medium.

\* \* \* \* \*

UNITED STATES PATENT AND TRADEMARK OFFICE
CERTIFICATE OF CORRECTION

PATENT NO.       : 7,027,185 B2
APPLICATION NO.  : 09/919207
DATED            : April 11, 2006
INVENTOR(S)      : Francesco Subirada et al.

It is certified that error appears in the above-identified patent and that said Letters Patent is hereby corrected as shown below:

On the Title page, in field (75), in "Inventors", in column 1, line 1, delete "Francesco" and insert -- Francesc --, therefor.

On the Title page, in field (57), under "Abstract", in column 2, line 5, delete "calorimeter" and insert -- colorimeter --, therefor.

In column 2, line 59, delete "calorimetric" and insert -- colorimetric --, therefor.

In column 2, line 60, delete "calorimetric" and insert -- colorimetric --, therefor.

In column 3, line 57, delete "calorimeter" and insert -- colorimeter --, therefor.

In column 3, line 63, delete "calorimeter" and insert -- colorimeter --, therefor.

In column 4, line 21, delete "calorimetric" and insert -- colorimetric --, therefor.

In column 4, lines 35-36, delete "calorimeter" and insert -- colorimeter --, therefor.

In column 7, lines 21-22, delete "calorimetrically" and insert -- colorimetrically --, therefor.

In column 7, line 60, delete "calorimeter" and insert -- colorimeter --, therefor.

In column 10, line 41, delete "is" before "single".

UNITED STATES PATENT AND TRADEMARK OFFICE
CERTIFICATE OF CORRECTION

PATENT NO. : 7,027,185 B2
APPLICATION NO. : 09/919207
DATED : April 11, 2006
INVENTOR(S) : Francesco Subirada et al.

It is certified that error appears in the above-identified patent and that said Letters Patent is hereby corrected as shown below:

In column 15, line 49, delete "calorimetric" and insert -- colorimetric --, therefor.

In column 23, line 11, in Claim 1, delete "calorimetrically" and insert -- colorimetrically --, therefor.

In column 25, line 14, in Claim 22, delete "calorimetrically" and insert -- colorimetrically --, therefor.

In column 25, line 18, in Claim 22, delete "calorimetrically" and insert -- colorimetrically --, therefor.

In column 26, line 28, in Claim 27, delete "calorimetrically" and insert -- colorimetrically --, therefor.

Signed and Sealed this

Nineteenth Day of May, 2009

JOHN DOLL
*Acting Director of the United States Patent and Trademark Office*